(12) United States Patent
Dominique et al.

(10) Patent No.: US 8,125,935 B2
(45) Date of Patent: Feb. 28, 2012

(54) METHODS FOR REDUCING POWER CONSUMPTION AT TRANSMITTERS AND RECEIVERS

(75) Inventors: Francis Dominique, Rockaway, NJ (US); Shirish Nagaraj, Whippany, NJ (US); Hongwei Kong, Denville, NJ (US); Walid Elias Nabhane, Bedminster, NJ (US)

(73) Assignee: Alcatel Lucent, Paris (FR)

( * ) Notice: Subject to any disclaimer, the term of this patent is extended or adjusted under 35 U.S.C. 154(b) by 1352 days.

(21) Appl. No.: 11/645,589

(22) Filed: Dec. 27, 2006

(65) Prior Publication Data
US 2008/0160951 A1 Jul. 3, 2008

(51) Int. Cl.
*G08C 17/00* (2006.01)
(52) U.S. Cl. ........ 370/311; 370/318; 370/332; 370/337; 370/349; 370/313; 455/343.1; 455/127.5; 455/343.2; 455/347; 455/522; 714/779
(58) Field of Classification Search .................. 370/318, 370/332, 337, 349, 352, 313; 455/343.1, 455/127.5, 343.2, 347, 522; 714/779
See application file for complete search history.

(56) References Cited

U.S. PATENT DOCUMENTS
6,643,276 B1 * 11/2003 Spets et al. .................... 370/328
(Continued)

FOREIGN PATENT DOCUMENTS
EP 1 592 163 2/2005

OTHER PUBLICATIONS

Lucent Technologies: "E-DPCCH enhancement for VoIP, R1-050939", Internet Citation [online] Aug. 29, 2005, XP002478083.

(Continued)

*Primary Examiner* — Nimesh Patel
(74) *Attorney, Agent, or Firm* — Harness, Dickey & Pierce

(57) ABSTRACT

Whether to process a control channel corresponding to a data channel carrying transmitted data based on a re-transmission indicator and a threshold value is determined at the receiver. The re-transmission indicator indicates a number of times the transmitted data has been transmitted. Control information received on the control channel is then selectively processed based on the determining step.

15 Claims, 5 Drawing Sheets

U.S. PATENT DOCUMENTS

| | | | |
|---|---|---|---|
| 2003/0119516 A1* | 6/2003 | Tomishima et al. | 455/445 |
| 2004/0047425 A1* | 3/2004 | Itoh | 375/259 |
| 2004/0048610 A1* | 3/2004 | Kim et al. | 455/422.1 |
| 2005/0073989 A1 | 4/2005 | Wang et al. | |
| 2005/0141467 A1* | 6/2005 | Pan et al. | 370/338 |

OTHER PUBLICATIONS

Lucent Technologies: "E-DPCCH Gain Factor Settings over Re-Transmissions", $3^{rd}$ Generation Partnership Project (3GPP); Technical Specification Group (TSG) Radio Access Network (RAN); Working Group 1, Apr. 1, 2005, XP003001120.

Nokia: "Uplink DPCCH Gating" [online] No. R1-050754, Sep. 2, 2005, XP002483635.

International Search Report and Written Opinion issued by the International Search Authority for counterpart International Application No. PCT/US2007/025768.

International Preliminary Report on Patentability dated Jul. 9, 2009.

Office Action dated Jul. 26, 2011 by the Chinese Patent Office for Chinese Application 200780048526.5 with English translation.

Korean Office Action dated Oct. 28, 2011, for Korean Application No. 10-2009-7013213 with English translation.

* cited by examiner

METHODS FOR REDUCING POWER CONSUMPTION AT TRANSMITTERS AND RECEIVERS

BACKGROUND OF THE INVENTION

Third generation (3G) wireless communication protocol standards (e.g., 3GPP-UMTS, 3GPP2-CDMA2000, etc.) may employ a dedicated traffic channel in the uplink (e.g., a communication flow between a mobile station (MS) or User Equipment (UE), hereinafter referred to as a user, and a base station (BS) or NodeB). The dedicated channel may include a data part (e.g., a dedicated physical data channel (DPDCH) in accordance with UMTS Release 4/5 protocols, a fundamental channel or supplemental channel in accordance with CDMA2000 protocols, etc.) and a control part (e.g., a dedicated physical control channel (DPCCH) in accordance with UMTS Release 4/5 protocols, a pilot/power control sub-channel in accordance with CDMA2000 protocols, etc.).

Newer versions of these standards, for example, Release 6 of UMTS provide for high data rate uplink channels referred to as enhanced dedicated channels (E-DCHs). An E-DCH may include an enhanced data part (e.g., an E-DCH dedicated physical data channel (E-DPDCH) in accordance with UMTS protocols) and an enhanced control part (e.g., an E-DCH dedicated physical control channel (E-DPCCH) in accordance with UMTS protocols).

FIG. 1 illustrates a conventional wireless communication system 100 operating in accordance with UMTS protocols. Referring to FIG. 1, the wireless communication system 100 may include a number of NodeBs such as NodeBs 120, 122 and 124, each serving the communication needs of a first type of user 110 and a second type of user 105 in their respective coverage area. The first type of user 110 may be a higher data rate user such as a UMTS Release 6 user, referred to hereinafter as an enhanced user. The second type of user may be a lower data rate user such as a UMTS Release 4/5 user, referred to hereinafter as a legacy user. The NodeBs are connected to an RNC such as RNCs 130 and 132, and the RNCs are connected to a MSC/SGSN 140. The components of the conventional wireless network shown in FIG. 1 are well-known in the art, and thus, a detailed discussion of some aspects of the conventional wireless network will be omitted for the sake of brevity.

An example of a frame structure for the E-DCHs (e.g., E-DPCCH and E-DPDCH) in the uplink direction is illustrated in FIG. 2. Each frame 200 may have a length of, for example, 10 milliseconds (ms) and may be partitioned into 5 sub-frames each including 3 slots. Each slot 205 may have a length of, for example, 2560 chips, and may have a duration of, for example, 2/3 ms. Consequently, each sub-frame may have a duration of 2 ms. As discussed above, an E-DCH includes an E-DPDCH 240 and an E-DPCCH 220, and each of the E-DPCCH 220 and the E-DPDCH 240 may be code multiplexed.

The E-DPCCH 220 carries control information for an associated E-DPDCH 240. This control information includes three components: a re-transmission sequence number (RSN), a transport format indicator (TFI) and a happy bit. The RSN indicates the transmission index of an associated packet transmitted on the E-DPDCH. That is, the RSN value indicates the number of times data associated with an upper layer enhanced dedicated transport channel (E-DTrCH) (hereinafter referred to as transport channel (TrCh) packet data), and associated control information has been transmitted by a UE without receiving an acknowledgment (ACK) from the NodeB in return. The RSN value for particular TrCh packet data and associated control information resets after an ACK from the NodeB is received at the transmitting UE. Currently in UMTS Release 6, the RSN has a maximum value of 3 and is represented by two bits.

The TFI indicates the data format for the transport channel carried by the associated E-DPDCH (e.g., transport block size, transmission time interval (TTI), etc.) and is represented by 7 bits. The TFI value may be a value selected from a transport format set (TFS) including all possible TFI values for a given transmission.

The happy bit is a binary indicator, which may be used by a UE to inform one or more NodeBs whether the UE is satisfied with the current setup of the E-DCH channels and is represented by a single bit. For example, UE 110 of FIG. 1 may use this indicator to inform one of the NodeBs 120/122/124 that the UE 110 can handle greater data capacity. In other words, the happy bit is a rate increase request bit.

FIG. 3 illustrates a conventional UMTS uplink transmitter 300 located, for example, at the enhanced UE 110 of FIG. 1 and a receiver 350 located at one of the NodeBs 120/122/124. The conventional transmitter 300 and receiver 350 of FIG. 3 may transmit and receive E-DCHs, respectively.

As shown in FIG. 3, data associated with an upper layer enhanced dedicated transport channel (E-DTrCH) may be processed into E-DPDCH frames at the transmission channel processing block 303. The frames may be binary phase shift keying (BPSK) modulated and orthogonally spread at the modulation and orthogonal spreading unit 304. The spread modulated frames are received by the gain unit 315 where an amplitude of the spread modulated frames may be adjusted. A combiner 320 receives the output of the gain unit 315.

Still referring to FIG. 3, the 2 RSN bits, the 7 TFI bits and the 1 happy bit are mapped into a 10-bit E-DPCCH word, which may be control information for an associated E-DPDCH frame having a TTI of, for example, 2 ms or 10 ms.

The 10-bit E-DPCCH word includes a happy bit set to a given value (e.g., '1' or '0'), a format indicator or TFI having a value corresponding to a data format for the transport channel carried by the associated E-DPDCH frame (e.g., transport block size, transmission time interval (TTI), etc.), and an RSN value between 0 and 3. The happy bit and the TFI may be referred to as control data.

The 10-bit E-DPCCH word may then be coded into a 30-bit coded sequence at an FEC unit 301. The 30-bit coded sequence is modulated at a BPSK Modulator 305 and orthogonally spread at an orthogonal spreading unit 310. The output from the orthogonal spreading unit 310 is gain adjusted at a gain unit 316 and output to the combiner 320.

Similar to the above E-DPCCH, well-known DPCCH frames used in determining, for example, channel estimates, are modulated at a BPSK Modulator 306, and the modulated frames are orthogonally spread at an orthogonal spreading unit 311. The spread modulated frames are received by a gain unit 317 where an amplitude of the spread modulated frames may be adjusted.

The outputs of each of the gain units 315, 316 and 317 are complex signals and are combined (e.g., code-division and/or I/Q multiplexed) into a combined signal by a combiner unit 320. The combined signal is scrambled and filtered by a shaping filter 325, and the output of the shaping filter 325 is sent to the receiver 350 via a propagation channel 330 (e.g., over the air).

After the transmitter 300 transmits the combined signal over the propagation channel 330, the transmitting UE awaits an ACK from the NodeB indicating that the transmitted signal has been successfully received and decoded.

If an ACK is received by the user, the transmitter 300 may transmit new E-DTrCH data. If an ACK is not received or an NACK is received, the UE may retransmit the same E-DTRCH data packet and similar control information via an E-DPDCH frame and corresponding E-DPCCH frame, respectively.

The re-transmitted E-DPCCH frame includes the same or different happy bit value, the same TFI value, and an incremented RSN value. For example, if the RSN value of the initial frame is N, the RSN value of the re-transmitted frame is N+1. Thus, RSN values for consecutive re-transmissions of the same data are correlated in that the values are incremented by one.

After retransmitting the data and associated control information (e.g., via an E-DPDCH frame and a corresponding E-DPCCH frame, respectively) including an RSN value of N+1, if still no ACK is received from the NodeB or a NACK is received, the UE may retransmit the data and similar control information again via another E-DPDCH frame and E-DPCCH frame, respectively. In this re-transmission (e.g., third transmission), the E-DPCCH frame may have an RSN value of N+2. The UE may continue to retransmit the non-acknowledged data until an ACK is received, or the number of re-transmissions reaches a threshold or maximum value.

At the receiver 350, the transmitted signal is received over the propagation channel 330, and input to the E-DPDCH processing block 335, E-DPCCH soft-symbol generation block 345 and a DPCCH channel estimation block 355. As is well-known in the art, the DPCCH channel estimation block 355 generates channel estimates using pilots transmitted on the DPCCH. The channel estimates may be generated in any well-known manner, and will not be discussed further herein for the sake of brevity. The channel estimates generated in the DPCCH channel estimation block 355 may be output to each of the E-DPDCH processing block 335 and the E-DPCCH soft-symbol generation block 345.

At the soft-symbol generation block 345, the received control signal may be de-scrambled, de-spread, and de-rotated/de-multiplexed to generate a sequence of soft-symbols. The E-DPCCH soft-symbols may represent an estimate of the received signal, or in other words, an estimate of the 30 symbols transmitted by the transmitter 300. The E-DPCCH soft-symbols may be further processed to recover the transmitted E-DPCCH word.

The E-DPCCH soft-symbols are output to an E-DPCCH discontinuous transmission (DTX) detection unit 365. The E-DPCCH DTX detection unit 365 determines whether the signal received on the E-DPCCH actually includes control information using a thresholding operation.

For example, the E-DPCCH DIX detection unit 365 may normalize a signal energy for a received E-DPCCH frame (e.g., the signal energy over a given TTI of 2 ms or 10 ms) and compare the normalized signal energy to a threshold. If the normalized signal energy is larger than the threshold, the E-DPCCH DTX detection unit 365 determines that a control signal is present on the E-DPCCH; otherwise, the E-DPCCH DTX detection unit 365 determines that a control signal is not present on the E-DPCCH and, subsequently, declares a discontinuous transmission.

If the E-DPCCH DTX detection unit 365 detects that a control signal is present on the E-DPCCH, the soft-symbols output from the soft-symbol generation block 345 are processed by the E-DPCCH decoding block 375 to recover (e.g., estimate) the 10-bit E-DPCCH word transmitted by the transmitter 300.

For example, in recovering the transmitted 10-bit E-DPCCH word, the E-DPCCH decoding block 375 may determine a correlation value or correlation distance, hereinafter referred to as a correlation, between the sequence of soft-symbols and each 30-bit codeword in a subset (e.g., 2, 4, 8, 16, 32, etc.) of all 1024 possible E-DPCCH codewords that may have been transmitted by the transmitter 300. This subset of codewords may be referred to as a codebook.

After determining a correlation between the sequence of soft-symbols and each of the codewords in the codebook, the E-DPCCH decoding block 375 selects the 10-bit E-DPCCH word corresponding to the 30-bit E-DPCCH codeword, which has the highest correlation to the E-DPCCH soft-symbols. The 10-bit E-DPCCH word is then output to the E-DPDCH processing block 335 for use in processing the E-DPDCH.

If the E-DPDCH is successfully received and decoded at the receiver 350, the NodeB transmits an ACK to the transmitting UE in the downlink; otherwise, the NodeB transmits a NACK (e.g., if the NodeB is a serving NodeB) or nothing (e.g., if the NodeB is a non-serving NodeB).

Some enhanced receivers may perform blind detection of E-DPDCH frames carrying E-DTrCh packet data, without the use of corresponding control information normally transmitted in an associated E-DPCCH frame. However, conventional receivers may waste unnecessary power by decoding the same control information each time the control information is retransmitted. This may result in unnecessary processing burdens at the NodeB and/or UE.

Moreover, unnecessarily transmitting the E-DPCCH may result in excessive and/or unnecessary power consumption, which may reduce the available power for other transmitted channels because the total power of the transmitter is limited to a maximum value. The excessive and/or unnecessary power consumption may also increase the interference on other users thereby decreasing system capacity.

SUMMARY OF THE INVENTION

Example embodiments of the present invention relate to methods for reducing power consumption at transmitters and processing power at receivers in a wireless communication system. Methods according to example embodiments of the present invention may be used alone or in combination with one another to achieve more power reduction and/or greater capacity.

At least one example embodiment provides a method for reducing power consumption at a receiver. In this method, whether to process a control channel at the receiver may be determined based on a re-transmission indicator and a threshold value. The control channel may correspond to a data channel carrying transmitted data. The re-transmission indicator may indicate a number of times the transmitted data has been transmitted. The control information received on the control channel may be selectively processed based on this determination.

According to at least this example embodiment, the retransmission indicator may be compared with the threshold value, and the control information received on the control channel may not be processed if the retransmission indicator is greater than or equal to the threshold value. The data channel may be processed to recover the received data using stored control information. The stored control information may be associated with a previous transmission of the data.

Alternatively, the control information may be processed if the re-transmission indicator is less than the threshold value. In this example, the processed control information may be stored and the data channel may be processed to recover the received data using the processed control information.

Whether received data has been successfully recovered may be determined, and an acknowledgement indicating the received data has been successfully recovered or a negative acknowledgement indicating the data has not been successfully recovered may be transmitted. The determination of whether to process the control channel if a negative acknowledgement is transmitted.

At least one other example embodiment provides a method for reducing power consumption at a transmitter. In this method, whether to encode control information at the transmitter may be determined based on a re-transmission indicator and a threshold value. The re-transmission indicator may indicate a number of previous transmissions of corresponding data on a data channel and the data channel may be associated with a control channel on which the control information is to be transmitted. The control information may be selectively encoded based on the determining step.

In at least this example embodiment, the re-transmission indicator may be compared with the threshold value and the control information may be encoded if the retransmission indicator is less than the threshold value. The corresponding data may be transmitted on the data channel and the control information may be transmitted on the control channel if the control information is encoded.

Alternatively, the control information may not be encoded if the retransmission indicator is greater than the threshold value, and the data may be transmitted on the data channel without associated control information. When the control information is not encoded, DTX frames may be transmitted in place of the control information.

At least one other example embodiment provides a method for reducing power consumption at a transmitter. In this method, whether to transmit control information from the transmitter may be determined based on a re-transmission indicator and a threshold value. The re-transmission indicator may indicate a number of previous transmissions of corresponding data on a data channel, and the data channel may be associated with a control channel on which the control information is to be transmitted. The control information may be selectively transmitted based on this determination.

According to at least this example embodiment, the re-transmission indicator may be compared with the threshold value, and the control information may not be transmitted if the retransmission indicator is greater than the threshold value. DIX frames may be transmitted in place of the control information. Alternatively, the control information may be transmitted if the retransmission indicator is less than the threshold value.

At least one other example embodiment provides a method in which a transmitter may transmit data on a data channel and control information on a control channel associated with the data channel. According to at least this example embodiment, the control information may include at least a re-transmission indicator portion and a transport format indicator portion, at least one of which may be constant. The control information may be associated with data transmitted on the data channel.

At least one other example embodiment provides a method in which a receiver may receive data on a data channel and control information on a control channel. According to at least this example embodiment, the control information may include at least a re-transmission indicator portion and a transport format indicator portion, at least one of which may be constant. The control information may be associated with data received on the data channel. The receiver may decode data using the received control information.

In one example, the transport format indicator may be constant and the transport format indicator may be blindly detected. Alternatively, or concurrently, the re-transmission indicator may be constant and the re-transmission indicator may be blindly detected.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Although the following description relates to a communication network or system based on CDMA technologies such as WCDMA/UMTS, and will be described in this example context with respect to FIG. 1, it should be noted that the example embodiments shown and described herein are meant to be illustrative only and not limiting in any way. For example, methods and/or apparatuses according to example embodiments of the present invention may be utilized in conjunction with any wireless technology, such as, IS95, cdma2000, similar and/or related technologies. Various modifications to example embodiments of the present invention will be apparent to those skilled in the art for application to communication systems or networks based on technologies other than the above, which may be in various stages of development and intended for future replacement of, or use with, the above networks or systems.

Example embodiments of the present invention may be implemented using a processor such as a digital signal processor (DSP) or application specific integrated circuit (ASIC). Alternatively, example embodiments of the present invention may be implemented at least in part in the form of a computer software program stored in a memory or external storage device. Such a program may be executed, for example, by a processor. The processor used to implement and/or execute at least some example embodiments of the present invention may be one of a plurality of processors included at a conventional NodeB and/or UE such as NodeB 120 and/or UE 110 of FIG. 1.

Figure 1:
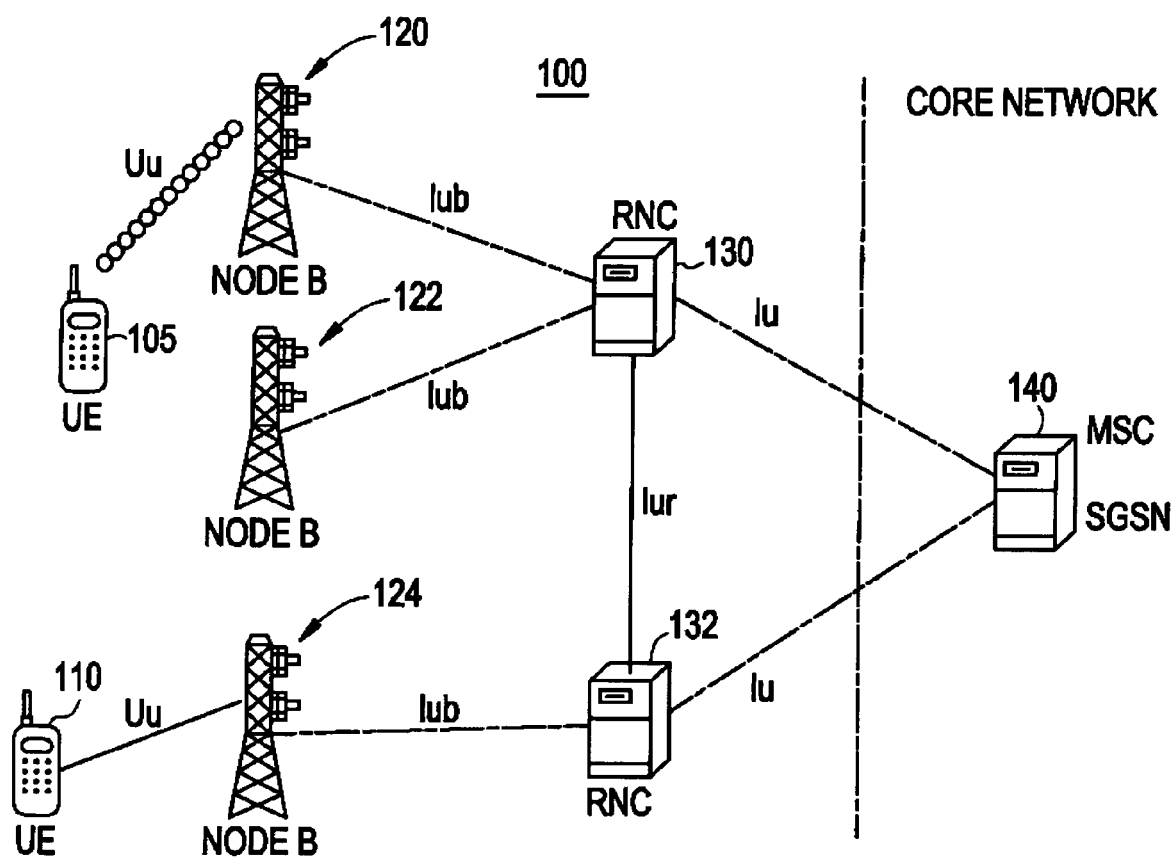
FIG. 1 illustrates a conventional wireless communication system operating in accordance with UMTS protocols.
Figure 2:
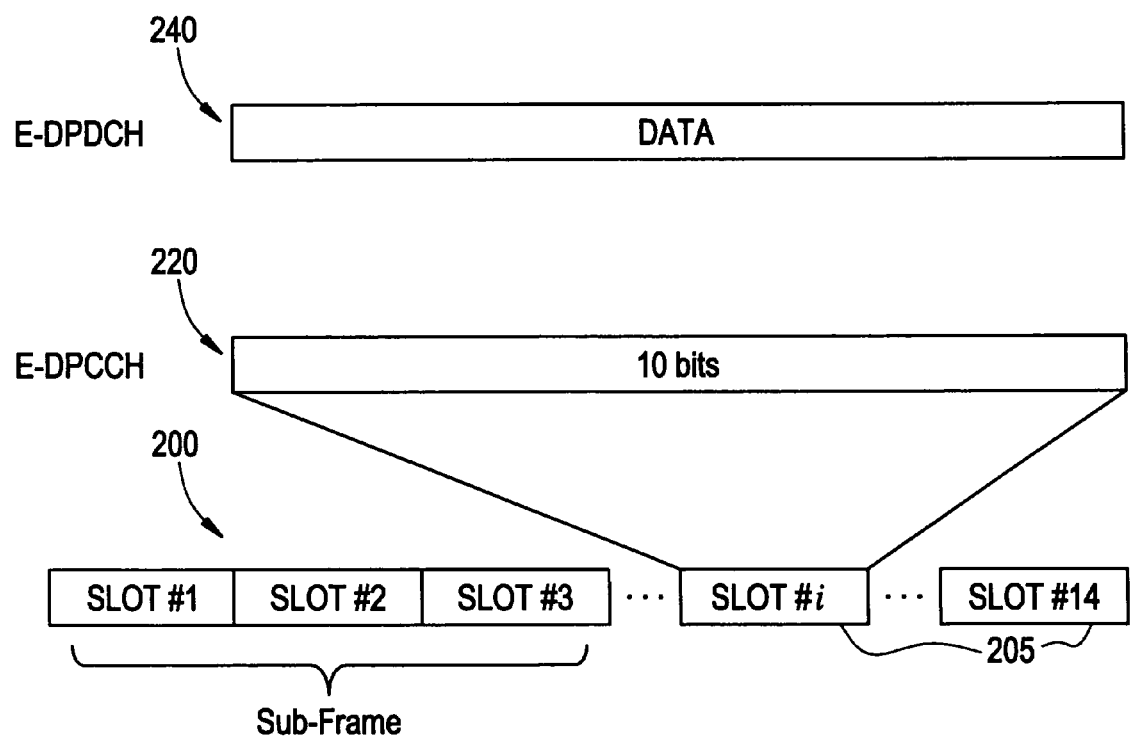
FIG. 2 illustrates an example of a conventional frame structure of enhanced uplink dedicated physical channels.

Referring to FIG. 1, when a user, such as UE 110 is switched on (e.g., is powered on) or enters a coverage area or cell of a NodeB, such as NodeB 120, UE 110 may inform the NodeB 120 and the RNC 130 of the user's capabilities via higher level signaling. Methods for doing so are well-known in the art. For example, UE 110 may indicate whether UE 110 is a legacy user or an enhanced user, what type of transmitter and/or receiver is included at UE 110, whether UE 110 supports blind detection of data transmitted on the E-DPDCH or control information transmitted on the E-DPCCH, etc. The RNC 130 may already have knowledge of analogous capabilities of the NodeB 120.

If the NodeB 120 supports blind detection of data transmitted on the E-DPDCH (herein after referred to as blind E-DPDCH detection), associated control information (e.g., a happy bit, an RSN and the TFI) carried by the E-DPCCH may not be needed to receive, decode and recover TrCh packet data received on the E-DPDCH.

Figure 4:
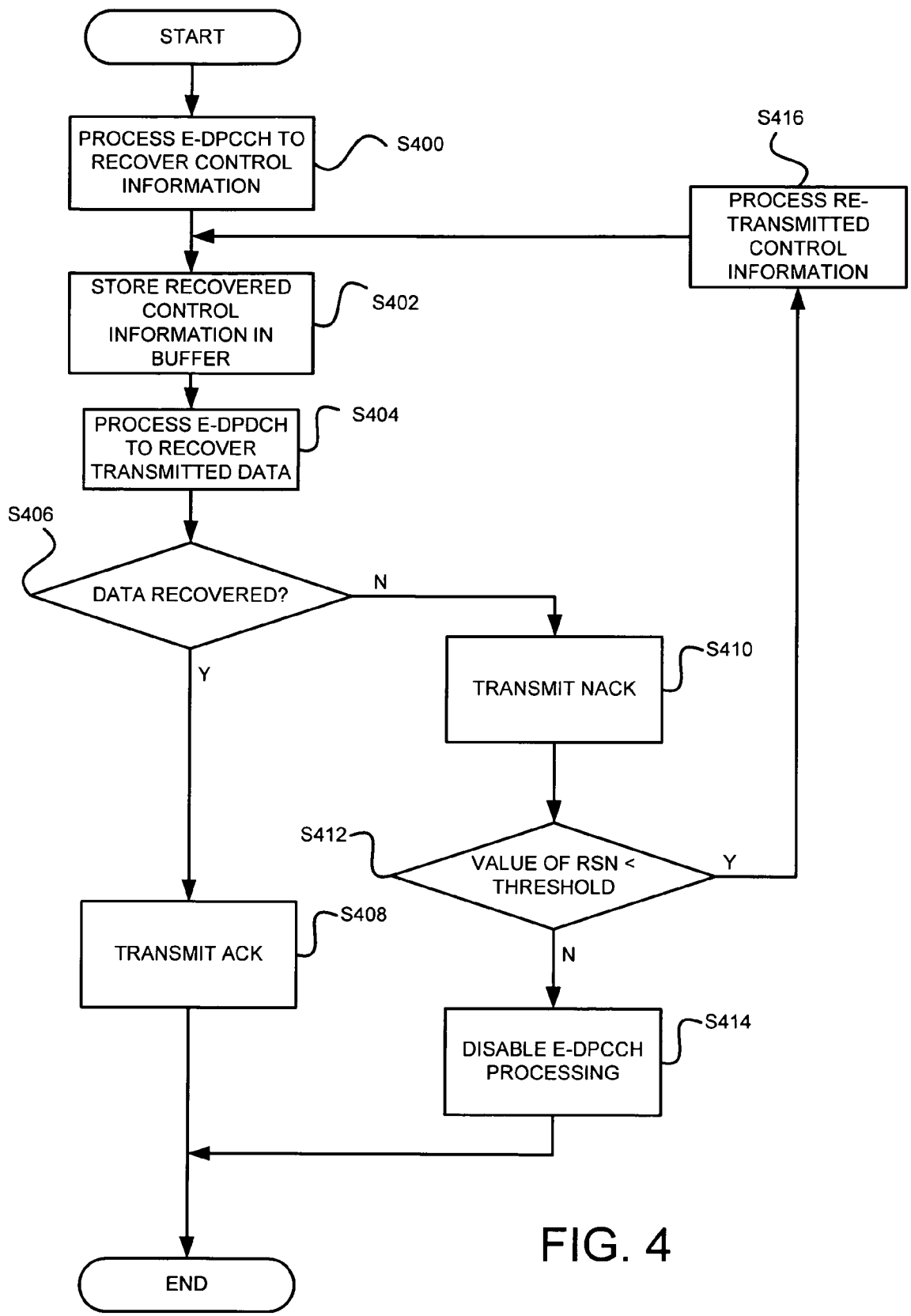
FIG. 4 is a flow chart illustrating a method for power reduction in a wireless communication system, according to another example embodiment of the present invention.

FIG. 4 illustrates a method for power reduction in a wireless communication network, according to another example embodiment of the present invention. The method shown in FIG. 4 may be performed at the Node B 120 or the UE 110. Herein, this example embodiment of the present invention will be discussed as being performed at the NodeB 120. However, this method may be performed at the UE 110 in the same or substantially the same manner. According to the method of FIG. 4, the NodeB 120 may selectively process a control channel (e.g., the E-DPCCH) corresponding to a data channel (e.g., the E-DPDCH) including data (e.g., TrCh packet data) based on a re-transmission indicator indicating a number of times the transmitted data has been transmitted and a threshold value.

Referring to FIG. 4, the NodeB 120 may discontinue or disable processing of the E-DPCCH after not successfully recovering data from a particular TrCh packet (hereinafter referred to as TrCh packet data) a threshold M number of times. Threshold M may be a configurable parameter determined at a higher layer, for example, at the RNC 130.

Figure 3:
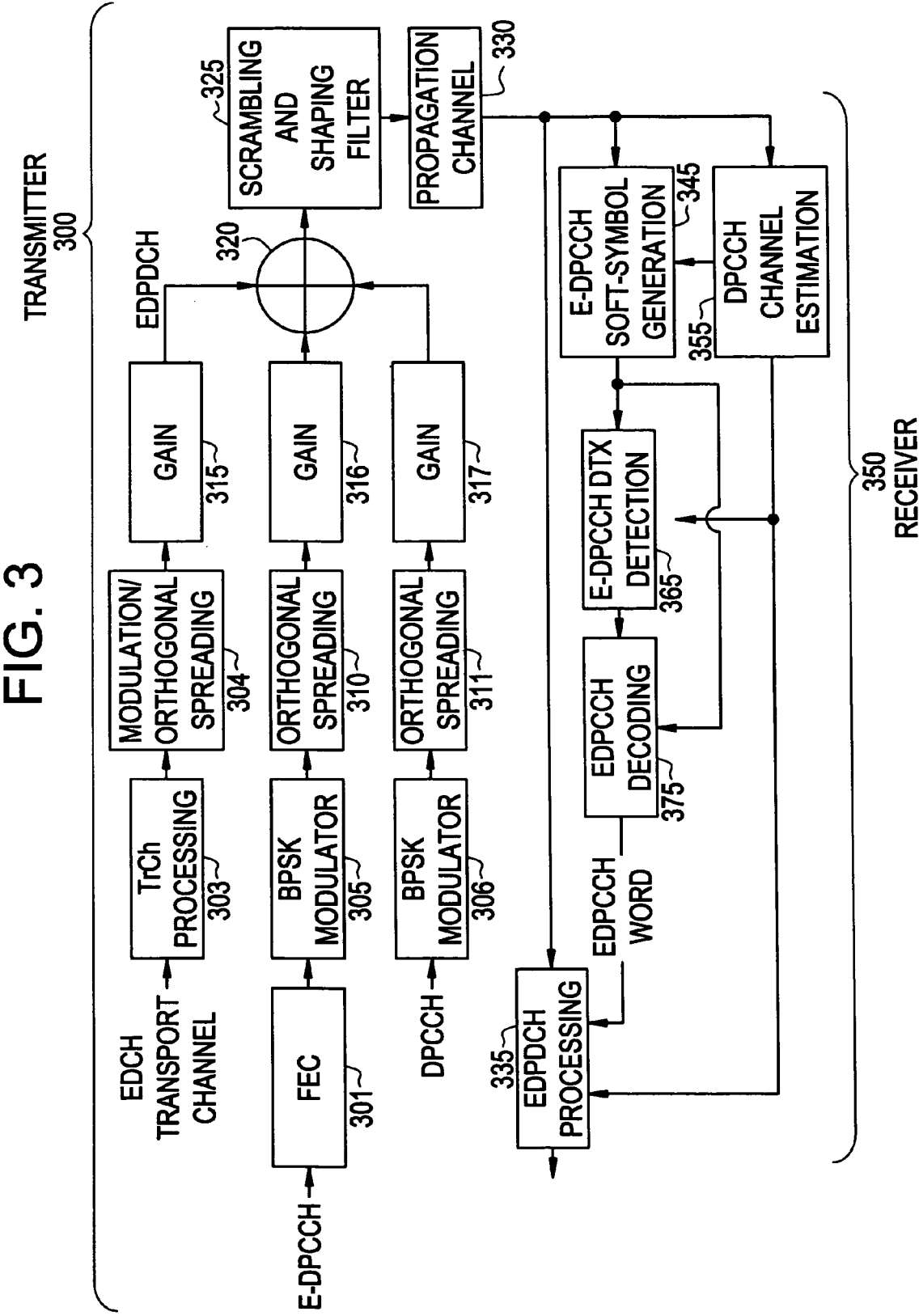
FIG. 3 illustrates a conventional UMTS uplink transmitter and receiver.

Referring to FIG. 4, at step S400 the NodeB 120 may process a received E-DPCCH frame to recover control information (e.g., a 10-bit E-DPCCH word) as described above with regard to FIG. 3. The recovered control information word may be stored in a buffer memory (not shown), at step S402. The buffer memory may be any suitable memory and/or storage device. For example, the buffer memory may be an existing buffer memory at the NodeB 120. At step S404, the NodeB 120 may recover the TrCh packet data transmitted in a corresponding E-DPDCH frame using the recovered control information.

At step S406, if the NodeB 120 determines that the TrCh packet data has been recovered properly, an ACK may be transmitted to the UE 110, at step S408. As discussed above, the ACK indicates to the UE 110 that the transmitted TrCh packet data has been recovered properly by the NodeB 120.

Returning to step S406, if the NodeB 120 determines that the TrCh packet data has not been recovered properly, the NodeB 120 may transmit a NACK to the UE 110, at step S410. As discussed above, each time the UE 110 retransmits particular TrCh packet data and corresponding control information on the E-DPDCH and E-DPCCH, respectively, the UE 110 may increment the RSN value N in the corresponding control information. That is, for example, the when the TrCh packet data is initially transmitted, the corresponding control information may include an RSN having a value of zero. When the TrCh packet data is re-transmitted, for example, after receiving a NACK (or no response) from the NodeB 120, the UE 110 may increment the RSN value N to 1, and retransmit the TrCh packet data and corresponding control information including the incremented RSN value.

Returning to FIG. 4, at step S412, the NodeB 120 may compare the RSN value N of the stored control information with the threshold M. If the RSN value N is less than the threshold value M, the NodeB 120 may continue processing the E-DPCCH, at step S416, for example, as discussed above with regard to FIG. 3.

Returning to step S412, if the RSN value N of the stored control information is greater than or equal to the threshold value M, the NodeB 120 may disable or discontinue processing the E-DPCCH in step S414, for example, until an ACK is transmitted in response to unacknowledged TrCh packet data, or the number of re-transmissions reaches a maximum. That is, for example, the NodeB 120 may disable processing of the E-DPCCH until the received TrCh packet data is properly recovered or the number of re-transmissions reaches a maximum value. While processing of the E-DPCCH is disabled, the NodeB 120 may use the most recent control information stored in the buffer memory to process E-DPDCH frames. Disabling decoding of the E-DPCCH may conserve processing power at the NodeB 120.

According to example embodiments of the present invention, the threshold M is a network parameter that may be configured at a higher layer, for example, at the RNC 130.

Figure 5:
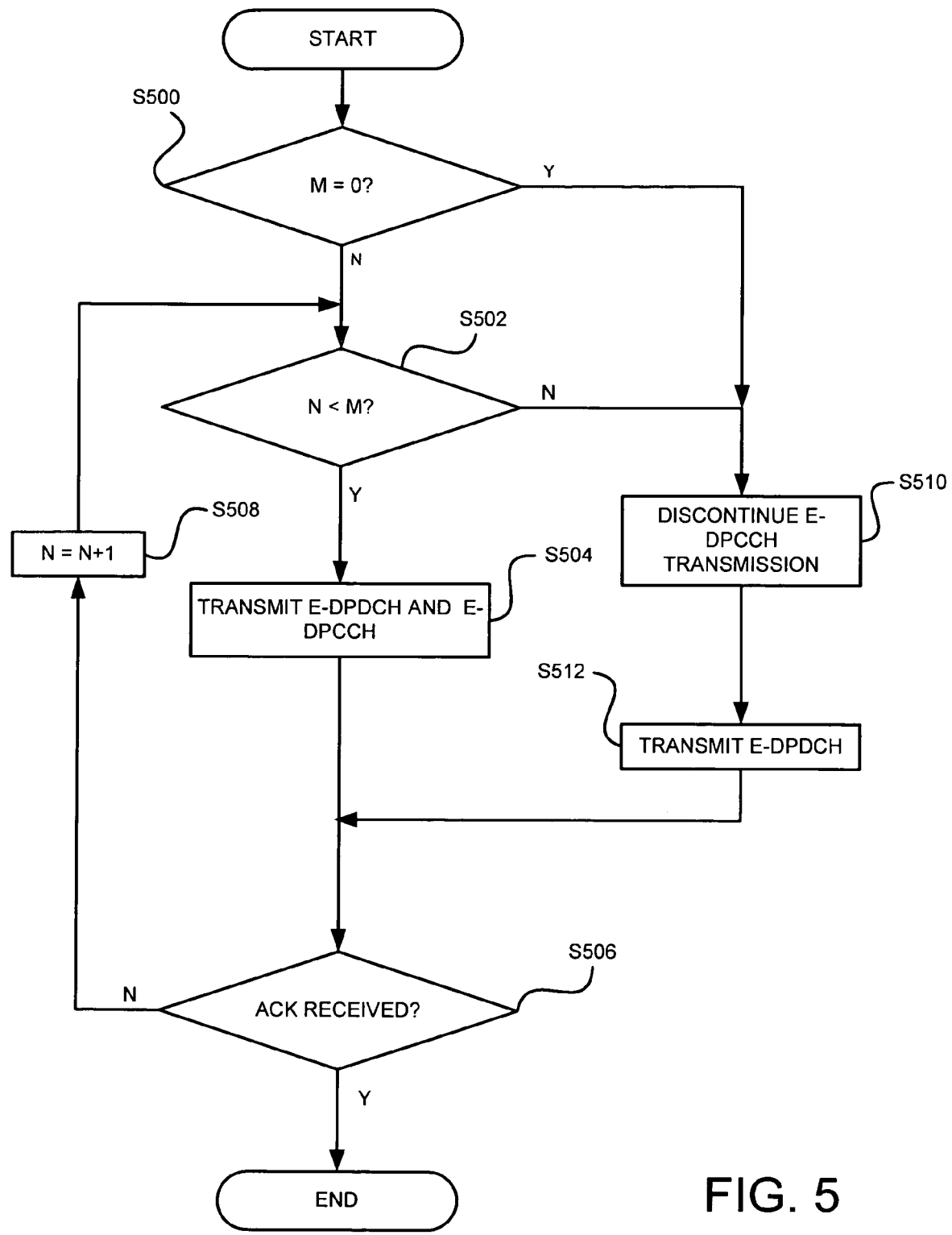
FIG. 5 is a flow chart illustrating a method for power reduction in a wireless communication system, according to another example embodiment of the present invention.

FIG. 5 illustrates another method, according to an example embodiment of the present invention. The example embodiment of the present invention shown in FIG. 5 may be performed in the uplink at the UE 110. However, this method may be performed in the down-link at the NodeB 120 in the same or substantially the same manner.

According to the method of FIG. 5, the UE 110 may selectively process and/or transmit control information received over the control channel (e.g., the E-DPCCH) based on a re-transmission indicator indicating a number of previous transmissions of corresponding data (e.g., TrCh packet data) on an associated data channel (e.g., the E-DPDCH) and a threshold.

As discussed above, control information transmitted by the UE 110 may include an RSN having a value N indicating the number of times particular TrCh packet data and corresponding control information has been transmitted on the E-DPDCH and E-DPCCH, respectively, without being acknowledged by the NodeB 120. The example embodiment shown in FIG. 5 may enable the UE 110 to conserve transmission power and/or processing power by transmitting DTX frames on the E-DPCCH after having transmitted a particular TrCh packet data and corresponding control information a threshold M number of times.

As discussed above, the NodeB 120 may be programmed with the threshold M indicating the number of times TrCh packet data and corresponding control information may be processed before discontinuing processing of the E-DPCCH at the NodeB 120. According to example embodiment of the present invention, the UE 110, in communication with the NodeB 120, may include the same parameter or threshold M.

Referring to FIG. 5, at S500, the UE 110 may check if the threshold M is set to zero. If M is zero, both the NodeB 120 and the UE 110 may be operating in a blind detection mode. As a result, control information need not be transmitted by the UE 110 on the E-DPCCH. Instead, the NodeB 120 may utilize blind detection of TrCh packet data carried by the E-DPDCH. In this example, to conserve processing and/or transmission power, the UE 110 may disable or discontinue transmitting control information on the E-DPCCH corresponding to the TrCh packet data at step S510. The UE 110 may then transmit the TrCh packet data on the E-DPDCH without transmitting corresponding control information on the E-DPCCH at step S512.

At step S506, if an ACK is received from the NodeB 120 in response to the transmitted TrCh packet data, the process may terminate.

The UE 110 may track the number of times the TrCh packet data has been transmitted without receiving an ACK using, for example, the RSN value N, or alternatively, through the use of a counter. The RSN value N may correspond to the value N discussed above. When TrCh packet is initially transmitted, the RSN value N of the corresponding control information is zero. Each time the TrCh packet is transmitted or re-transmitted on the E-DPDCH after the initial transmission, the RSN value N is incremented by 1 (N=N+1).

Returning to step S506, if an ACK is not received from the NodeB 120, the UE 110 may increment the RSN value N at step S508. At step S502, the UE 110 may compare the RSN value N with the threshold parameter M. If the RSN value is greater than or equal to the threshold parameter M, the process may proceed to step S510, and continue as discussed above.

Returning to step S502, if the RSN value N is less than the threshold parameter M, the UE 110 may transmit or re-transmit the TrCh packet and corresponding control information on the E-DPDCH and E-DPCCH, respectively, at step S504. The process may then proceed to step S506 and continue as discussed above.

Returning to step S500, if M is not equal to 0, the process may proceed to step S502 and continue as discussed above.

The method of FIG. 5 may enable a transmitter at the UE 110 to conserve processing and/or transmission power by disabling transmission of the E-DPCCH and/or transmitting only DTX frames on the E-DPCCH in place of previously transmitted and received control information.

As discussed above, in one example, threshold M may be zero. In this example, no control information may be transmitted on the E-DPCCH. In another example, threshold M may be 3, and the UE 110 may discontinue transmission of control information on the E-DPCCH after 3 re-transmissions of the same TrCh packet data and corresponding control information on the E-DPDCH and E-DPCCH, respectively. Control information associated with TrCh packet data may be re-transmitted any number of times, for example, between 0 and 60.

As discussed above, threshold M may be a configurable parameter supplied from a higher layer, for example, at the RNC 130.

Another example embodiment of the present invention may reduce processing complexity and/or power at the transmitter and/or receiver by transmitting a known, constant portion of the control information.

As discussed above, control information may include a happy bit, a re-transmission indicator portion (e.g., the RSN) and a transport format indicator portion (e.g., TFI). The happy bit may be a single bit, the RSN may be 2-bits in length and the TFI may comprise 7 bits. In this example embodiment, a portion of the control information (e.g., the RSN and/or the TFI) may be constant and known to both the UE 110 and the NodeB 120. In this example, the NodeB 120 need only blindly detect the constant portion of the control information (e.g., the RSN or the TFI). Although discussed herein with respect to NodeB 120, it will be understood that example embodiments of the present invention may be performed in the same or substantially the same manner at the UE 110.

In one example, the transport format indicator portion (e.g., TFI) of the control information may be constant (e.g., the same for control information associated with each transmitted TrCh packet) and known to both the UE 110 and the NodeB 120. The constant transport format indicator portion may be determined, for example, at the RNC 130 to maximize the coding gain of the above-discussed size-limited codebook and/or according to network conditions. Methods for maximizing coding gain that may be used to select a constant transport format indicator portion are well-known in the art, and therefore, a detailed discussion of these methods will be omitted for the sake of brevity. In accordance with example embodiments of the present invention, any suitable method may be used.

When a constant transport format indicator portion of the control information is used, the NodeB 120 may blindly detect this portion of the control information using any suitable method for blind detection. As blind detection methods are well-known in the art, a detailed discussion will be omitted for the sake of brevity.

For example, if the transport format indicator portion is the 7-bit TFI, the NodeB 120 need only blindly detect the 7-bit TFI, rather than all 10-bits of control information normally associated with conventional blind detection.

In another example, the re-transmission indicator portion (e.g., RSN) of the control information may be constant. If the re-transmission indicator portion of the control information is constant, the re-transmission indicator portion (e.g., the 2-bit RSN) may be known to both the UE 110 and the NodeB 120 and may be the same for control information associated with each transmitted TrCh packet. As discussed above with regard to a constant transport format portion of the control information, the constant re-transmission indicator portion may be determined at the RNC 130 to maximize the coding gain of the above-discussed size-limited codebook and/or according to network conditions.

When a re-transmission indicator portion of the control information is constant, the NodeB 120 may blindly detect only this portion of the control information using any suitable method for blind detection. Because these blind detection methods are well-known in the art, a detailed discussion will be omitted for the sake of brevity.

For example, if the re-transmission indicator portion is the 2-bit RSN, the NodeB 120 need only blindly detect the 2-bit RSN portion of the transmitted control information, rather than the 7-bit TFI portion or all 10-bits of the control information.

Example embodiments of the present invention may be used alone, or in combination with one another, to achieve further E-DPCCH power reduction.

The invention being thus described, it will be obvious that the same may be varied in many ways. Such variations are not to be regarded as a departure from the invention, and all such modifications are intended to be included within the scope of the invention.

We claim:

1. A method for reducing power consumption at a receiver, the method comprising:
   comparing a re-transmission indicator with a threshold value, the re-transmission indicator being a portion of control information transmitted on a control channel between a transmitter and the receiver, and indicating a number of times a same data has been transmitted from the transmitter to the receiver on a data channel;
   determining not to process the control channel at the receiver if the re-transmission indicator is greater than or equal to the threshold value, the control channel corresponding to the data channel carrying the transmitted data; and
   processing the data channel to recover the received data using stored control information associated with a previous transmission of the data on the data channel, the previous transmission of the data being a prior transmission of the same data on the data channel.

2. The method of claim 1, wherein
   the control information is processed if the re-transmission indicator is less than the threshold value.

3. The method of claim 2, further comprising:
storing the processed control information; and
processing the data channel to recover the received data using the processed control information.

4. The method of claim 1, further comprising:
deciding whether received data has been successfully recovered; and
transmitting an acknowledgement indicating the received data has been successfully recovered or a negative acknowledgement indicating the data has not been successfully recovered based on the deciding step; wherein
the determining step determines not to process the control channel in response to transmission of a negative acknowledgement.

5. A method for reducing power consumption at a transmitter, the method comprising:
comparing a re-transmission indicator with a threshold value, the re-transmission indicator being a portion of control information transmitted on a control channel between the transmitter and a receiver, and indicating a number of times a same data has been transmitted from the transmitter to the receiver on a corresponding data channel;
determining not to encode control information at the transmitter if the re-transmission indicator is greater than or equal to the threshold value; and
transmitting the same data on the data channel without associated control information on the control channel if the determining step determines not to encode the control information.

6. The method of claim 5, wherein
the control information is encoded if the re-transmission indicator is less than the threshold value.

7. The method of claim 6, further comprising:
transmitting data on the data channel and the control information on the control channel if the control information is encoded.

8. The method of claim 5, further comprising:
transmitting DTX frames in place of the control information if the determining step determines not to encode the control information.

9. A method for reducing power consumption at a transmitter, the method comprising:
comparing a re-transmission indicator with a threshold value, the re-transmission indicator being a portion of control information transmitted on a control channel between the transmitter and a receiver, and indicating a number of times a same data has been transmitted from the transmitter to the receiver on a corresponding data channel;
determining not to transmit control information from the transmitter if the re-transmission indicator is greater than the threshold value; and
transmitting the same data on the data channel without associated control information on the control channel if the determining step determines not to transmit the control information.

10. The method of claim 9, further comprising:
transmitting DTX frames in place of the control information if the determining step determining not to transmit the control information.

11. The method of claim 9, wherein
the control information is transmitted if the retransmission indicator is less than the threshold value.

12. A method, comprising:
transmitting, from a transmitter, data on a data channel and control information on a control channel associated with the data channel, the control information including at least a re-transmission indicator portion and a transport format indicator portion, and the control information being associated with the data transmitted on the data channel, at least one of a value of the transport format indicator portion and a value of the re-transmission indicator portion being constant between transmissions of the control information on the control channel.

13. A method, comprising:
receiving, at a receiver, data on a data channel and control information on a control channel, the control information including at least a re-transmission indicator portion and a transport format indicator portion and the control information being associated with data received on the data channel, at least one of a value of the transport format indicator portion and a value of the re-transmission indicator portion being constant between transmissions of the control information on the control channel;
blindly detecting the at least one of the value of the transport format indicator and the re-transmission indicator portion, which is constant; and
decoding data using the received and blindly detected control information.

14. The method of claim 13, wherein the transport format indicator is constant between transmissions of the control information on the control channel.

15. The method of claim 13, wherein the re-transmission indicator is constant between transmissions of the control information on the control channel.

* * * * *